2,985,646
CHROMIUM-CONTAINING DYESTUFFS

Guido Schetty, Walter Biedermann, and Fabio Beffa, Basel, Switzerland, assignors to J. R. Geigy A.-G., Basel, Switzerland
No Drawing. Filed Mar. 10, 1958, Ser. No. 720,023
Claims priority, application Switzerland Mar. 14, 1957
6 Claims. (Cl. 260—145)

The present invention concerns a process for the production of water soluble, chromium-containing dyestuffs. It also embraces the new dyestuffs obtained by this process and also the use thereof for the dyeing and printing of organic material.

The reaction of heavy metal-containing azomethine dyestuffs containing water soluble groups with metallisable compounds which in themselves are colourless to form metal-containing dyestuffs containing a whole metal atom bound in complex linkage to one azomethine molecule is already known. Also the conversion of soluble azomethine dyestuffs under certain conditions with the aid of agents giving off heavy metal into compounds in which two azomethine molecules are bound in complex linkage by one metal atom is known. Such dyestuffs are suitable for the dyeing of wool and other material and also some of the dyeings have satisfactory fastness properties. A great disadvantage of these dyestuffs however, is the limited number of shades available; also some of the dyestuffs have only slight colour strength.

In contrast to the above it has now been found that strongly coloured dyestuffs of the most various shades can be produced if an o.o'-dihydroxyazomethine dyestuff which may possibly also contain arylazo groups and an o.o'-dihydroxyazo dyestuff are reacted either together or one after the other with an agent giving off chromium, the reaction being performed under such conditions that one molecule of the azomethine dyestuff and one molecule of the azo dyestuff are bound in complex linkage with a chromium atom. In this reaction the dyestuff components are so chosen that the reaction product contains a carboxylic acid or a sulphonic acid group as solubility promoter. The new azo-azomethine dyestuffs obtained according to this process are soluble in water and, even from a neutral to weakly acid bath they have good drawing power onto wool and other material having similar behaviour on dyeing. At the same time the new dyestuffs have very good levelling power and the dyeings attained therewith are very fast to light.

Some of the azomethine dyestuffs as used in the present process are known, others can be produced by known processes. For example they are easily attained from aromatic o-hydroxyaldehydes and o-hydroxyamino compounds by condensation in a weakly acid, neutral to alkaline medium. Instead of the o-hydroxyamino compounds, also the alkyl ethers thereof can be used provided that in the chroming reaction the alkoxy substituent can be converted into a hydroxyl group bound to the metal atom. The azomethine dyestuffs can contain as substituents for example halogen atoms, alkyl, alkoxy, nitro, acyl, acylamino, alkyl or aryl sulphonyl, sulphamide groups and sulphamide groups substituted at the nitrogen atom, carboxylic acid, carboxylic acid ester and carboxylic acid amide groups as well as sulphonic acid ester and sulphonic acid groups. Also azomethine dyestuffs containing arylazo groups can be used however, such as are obtained for example by coupling diazonium compounds with suitable o-hydroxyaldehydes and condensing the arylazo-arylaldehydes obtained with aromatic o-hydroxyamino compounds. Examples of aromatic aldehydes which can be used for the production of azomethine dyestuffs according to the present invention are:

2-hydroxybenzaldehyde, 3- and 5-methyl-2-hydroxybenzaldehyde, 3.5- and 3.6-dimethyl-2-hydroxybenzaldehyde, 5-butyl-2-hydroxybenzaldehyde, 5-chloro- or -bromo-2-hydroxybenzaldehyde, 3- and 4- chloro-2-hydroxybenzaldehyde, 3.5-dichloro-2-hydroxybenzaldehyde, 3-chloro-5-methyl- and 3-methyl-5-chloro-2-hydroxybenzaldehyde, 3- and 4- and 5-nitro-2-hydroxybenzaldehyde, 3.5-dinitro- and 4-chloro-5-nitro-2-hydroxybenzaldehyde, 2.4- and 2.5-dihydroxybenzaldehyde, 4-methoxy-2-hydroxybenzaldehyde, 3 - methoxy-2-hydroxybenzaldehyde, 2-hydroxybenzaldehyde-5-sulphonic acid, 2-hydroxy-5-methyl-benzaldehyde-3-sulphonic acid, 4-hydroxy-3-formyl-benzoic acid, 4-hydroxy-3-formyl-diphenyl, 1-hydroxy-2-naphthaldehyde and its derivative chlorinated in the 4-position, 2-hydroxyl-1-and-3-naphthaldehyde, 2.4-dihydroxynaphthaldehyde, 2-hydroxy-1-naphthaldehyde-3 - carboxylic acid, 1-hydroxy-2-naphthaldehyde-5-sulphonic acid and 5-[benztriazolyl-(2)]-2-hydroxybenzaldehyde. o-Hydroxyamino compounds and the alkyl ethers thereof which on condensing with the o-hydroxyaldehydes lead to azomethine dyestuffs usable according to the present invention are, for example, the usual starting and middle components in metallisable azo dyestuffs. They can be both of the benzene and the naphthalene series as well as higher condensed aromatic compounds or aromatic compounds bound with heterocyclic rings.

The o.o'-dihydroxy azo dyestuffs used in the process according to the present invention as second component can be monoazo or disazo dyestuffs and they can be produced by the usual methods. Aromatic o-hydroxyamino compounds can be used as diazonium components in the production thereof. Also such aromatic amines are suitable however which contain a substituent in the o-position which is converted during the chroming reaction into a hydroxyl group bound to the metal atom. Such compounds are for example o-alkoxy arylamines which are simetimes to be preferred to the corresponding o-hydroxyamino compounds because of their more easy accessibility and better coupling powers. Examples of diazonium components which can be used are: diazotised 2-amino-1-hydroxybenzene and 2-amino-1-methoxybenzene, diazotised 4-chloro- and 4.6-dichloro-2-amino-1-hydroxybenzene, 4- or 5- or 6-nitro-2-amino-1-hydroxybenzene, 4-chloro- and 4-methyl- as well as 4-acetylamino-6-nitro-2-amino-1-hydroxybenzene, 6-acetylamino- and 6-chloro-4-nitro-2-amino-1-hydroxybenzene, 4 - cyano-2-amino-1-hydroxybenzene, 4-methoxy-2-amino-1-hydroxybenzene, 2-amino-1.5-dihydroxybenzene, 2 - amino-1-methoxybenzene-4- or -5-carboxylic acid, 2-amino-1-hydroxybenzene-6-sulphonic acid and its derivatives nitrated in the 4-position, 2-amino-1-hydroxybenzene-5-methyl- and -5-benzyl sulphone, 2-amino-1-hydroxybenzene-4-methyl-, -ethyl-, -propyl- and -butyl sulphone, 6-chloro- and 6-nitro-2-amino-1-hydroxybenzene-4-methyl sulphone, 2-amino-1-hydroxybenzene-4- or -5-sulphamide, -sulpho-N-methyl- and -sulpho-N.β-hydroxyethyl amide, 2-amino-1-methoxybenzene-4-sulphanilide, 2-amino-1-hydroxybenzene-4-sulphanilide-2'-carboxylic acid, 4-amino-3-hydroxydiphenyl sulphone, 1-amino-2-hydroxynaphthalene-4-sulphonic acid and its 6-nitro derivative, 1-amino-2-methoxynaphthalene-6-sulphonic acid and 3-amino-4-hydroxy-1.1'-azobenzene-3'-sulphonic acid.

The usual azo components are used, that is compounds having phenolic hydroxyl groups such as hydroxybenzenes and in particular hydroxynaphthalenes, then compounds containing a carbon atom in a heterocyclic ring which can be coupled such as, e.g. 5-pyrazolones can also be used. Such azo components can be used both for the monoazo as well as the disazo dyestuffs used according to the present invention. If monoazo dyestuffs are used, they must couple in the o-position to a hydroxyl group.

Diazo dyestuffs can be produced for example by reacting an o-hydroxy or o-alkoxy diazonium compound of which examples have been given above with an azo component having two groups determining the coupling and then reacting with the second diazo component. Aniline, its homologues and the nitro and/or halogen derivatives thereof as well as aminonaphthalenes and the sulphonic acids and carboxylic acids of these compounds can be used as second diazonium components. Naturally, this second type of diazonium component can be reacted first with the azo component which is capable of being coupled twice and then the o-hydroxy or o-alkoxy diazonium compound can be coupled with the azo component. In practice the order in which the diazonium compounds used are coupled is determined by the relative coupling energy thereof. In the azo component which can be twice coupled, at least on substituent determining the coupling must be a hydroxyl group, the other can also be an amino group. Examples of such azo components are: resorcin, 3-amino-1-hydroxybenzene, 3-hydroxy-diphenylamine, 2.5.7- and 2.8.6-aminohydroxy-naphthalene sulphonic acid, 1.8.4-aminohydroxy-naphthalene sulphonic acid and the N-alkyl and N-aryl derivatives thereof and 1.6-dihydroxynaphthalene-3-sulphonic acid.

A further type of disazo dyestuffs is obtained by coupling a diazonium compound with a hydroxy or alkoxy amino compound of the benzene and naphthalene series, diazotisation of the aminoazo dyestuff obtained and again coupling with an azo component, care being taken that a hydroxyl group or a substituent which can be converted into a hydroxyl group is present in each of the o- and o'- positions to an azo group. For example 1-amino-2-methoxybenzene, 1-acetylamino-2-hydroxybenzene, 1-amino-2-methoxy-5-methylbenzene, 1-amino-2-methoxy-5-acetylaminobenzene, 2-amino-hydroquinone dimethyl ether, 2-amino-5-hydroxynaphthalene-7-sulphonic acid and 1-amino-2-methoxynaphthalene as well as the 6- and 7-sulphonic acids thereof can be used as further diazotisable azo components for disazo dyestuffs of the type mentioned above.

The azo-azomethine dyestuffs which contain both an azomethine and an azo dyestuff bound in complex linkage by a chromium atom according to the present invention are produced in various ways. For example, a mixture of an azomethine and an azo dyestuff can be treated with agents giving off chromium. The chroming is performed under conditions which are known and used for the production of complex chromium compounds containing two different azo dyestuffs bound to one chromium atom. Both inorganic and organic salts of this metal and also complex compounds of this metal can be used as chroming agent.

A second method for the production of azo-azomethine dyestuffs according to the present invention consists in producing the so-called 1 : 1 chomium complex from one of the two dyestuffs, preferably from the azo dyestuff, and then reacting this with the other metal-free dyestuff. The process for the production of such 1 : 1 chromium complexes, i.e. dyestuffs which contain a whole chromium atom bound in complex linkage per molecule, has often been described, in particular for azo dyestuffs. For example the dyestuff free from complex forming metal is treated in an acid medium with an excess of a salt of trivalent chromium, for example chromic formiate or chromic fluoride, at a raised temperature. If an o-alkoxy-o'-hydroxyazo dyestuff is used as starting product, the chroming must be performed under such conditions that the alkoxy group is split from the o-alkoxy-o'-hydroxy azo group. The reaction of the 1:1 complex with the metal-free dyestuff is performed advantageously in aqueous or aqueous/alcoholic, neutral to alkaline medium at normal or raised temperature. Although this second method for the production of azo-azomethine dyestuffs according to the present invention is somewhat more complicated, it enables the production of particularly uniform dyestuffs which are distinguished by the purity of their dyeings. In addition, it is possible to simplify this process if the 1:1 chromium complex of the azo dyestuff is used as starting material by treating this complex in a neutral to weakly acid medium with the equimolecular amount of aromatic o-hydroxyaldehyde and o-hydroxyamine without previously isolating the azomethine dyestuff formed from these two components.

According to the present invention it is possible to combine an azomethine dyestuff which can contain further arylazo groups with a monoazo dyestuff or a disazo dyestuff. As defined, one of the two dyestuff components contains a carboxylic acid or sulphonic acid group as solubilising radical. The solubility of the end product can be favourably influenced by the presence of hydrophilic groups but it is also dependent on the size of the dyestuff molecule present. It is possible by a suitable choice of the single dyestuff components to influence the solubility in the desired direction within certain limits.

Dyestuffs in which the azomethine component is produced from hydroxynaphthaldehyde have proved valuable; their drawing power and fastness to light is generally to superior to that of corresponding compounds produced from salicylaldehydes.

Another group which is worthy of special mention contains a so-called eriochrome black dyestuff as azo dyestuff. Such dyestuffs are obtained by coupling diazotised 2-hydroxy-1-aminonaphthalene-4-sulphonic acid which can be further substituted with a hydroxynaphthalene compound. These dyestuffs are distinguished by good fastness to light and strong shades.

A further group of particularly valuable dyestuffs is obtained by using a dihydroxy azomethine dyestuff containing no sulphonic acid groups, in which dyestuff the aldehyde or the aminophenol also contains a phenylazo group which may possibly be substituted. Such dyestuffs have a good drawing power, good wet fastness properties and generally a good fastness to light.

The new chromium-containing dyestuffs correspond to the general formula:

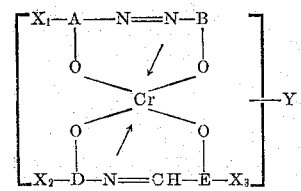

wherein

A and E each represents a member selected from the group consisting of benzene and naphthalene radicals containing the metallised group in o-position to the azo or azomethine group, B represents a member selected from the group consisting of benzene, naphthalene and 5-pyrazolone radicals containing the metallised group in o-position to the azo group, D represents a benzene radical containing the metallised group in o-position to the azomethine group.

$X_1$, $X_2$ and $X_3$ each represents a member selected from the group consisting of hydrogen and —N=N—Ar, Ar being an aromatic carbocyclic radical which contains at most two rings, and Y represents an acid group selected from the group consisting of —SO$_3$H and —COOH.

A technically particularly valuable class of dyestuffs corresponds to the formula:

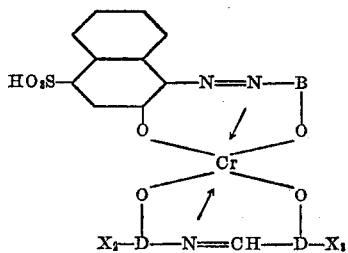

wherein

B represents a naphthalene radical containing the metallised group in o-position to the azo group, D and E represent a benzene radical containing the metallised group in o-position to the azo or azomethine group, and of $X_2$ and $X_3$, one X represents a phenylazo group and the other X represents hydrogen.

A further group of interesting dyestuffs corresponds to the formula:

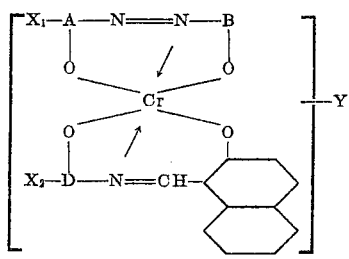

wherein

A represents a member selected from the group consisting of benzene and naphthalene radicals containing the metallised group in o-position to the azo group, B represents a member selected from the group consisting of benzene, naphthalene and 5-pyrazolone radicals containing the metallised group in o-position to the azo group, D represents a benzene radical containing the metallised group in o-position to the azomethine group, $X_1$ and $X_2$ each represents a member selected from the group consisting of hydrogen and phenylazo radicals, and Y represents an acid group selected from the group consisting of —SO$_3$H and —COOH.

The complex chromium compounds obtained according to the present invention are used advantageously in the form of the ammonium or alkali salts, e.g. as lithium, potassium, sodium, rubidium or caesium salts and the chromium compounds are soluble in water and in a weakly acid aqueous medium. They are suitable for the dyeing of wool and other material having similar dyeing properties such as silk, superpolyamide and superpolyurethane fibres and leather in yellow, orange, red, brown, olive, green to black shades from a weakly acid to neutral bath. The dyeings obtained therewith have good wet fastness properties, have good fastness to light and are distinguished in particular by their good level quality. The new dyestuffs are also suitable for the printing of the materials mentioned.

The following examples serve to illustrate the invention, without limiting it in any way. Where not otherwise stated, parts are given as parts by weight and the temperatures are given in degrees centigrade. The relationship to parts by weight to parts by volume is as that of kilogrammes to litres.

*Example 1*

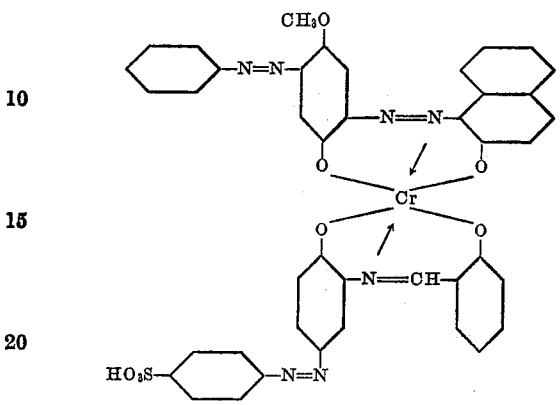

3.97 parts of the azomethine-azo dyestuff produced by condensing 3-amino-4-hydroxyazobenzene - 4' - sulphonic acid with salicylaldehyde and 2 parts of crystallised sodium acetate are added to 100 parts of 50% ethanol. The complex chromium compound of the type 1 chromium atom: 1 molecule dyestuff which corresponds to 0.52 part of chromium and 3.98 parts of the disazo dyestuff from diazotised 5-phenylazo-4-methoxy-2-amino-1-hydroxybenzene and 2-hydroxynaphthalene is also added. The whole is heated for 1 hour at 50–60°, the alcohol is distilled off, the dyestuff formed is salted out and filtered off. After drying, a dark powder is obtained which is the sodium salt of the dyestuff having the formula given above. It dyes wool in green shades.

The 1:1 chromium complex dyestuff used as starting material is obtained, for example by chroming while entmethoxylating the disazo dyestuff aniline→aminohydroquinone dimethyl ether→β-naphthol in formamide. For example the metal-free dyestuff is heated for some hours at 130–135° with excess chromic formiate.

*Example 2*

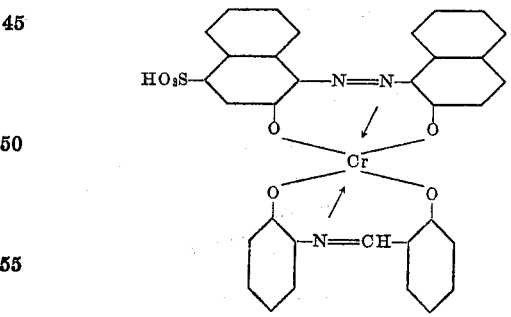

1.2 parts of ammonium acetate, 1.09 parts of 2-amino-1-hydroxybenzene and 1.22 parts of salicylaldehyde are added to 100 parts of water. The complex chromium compound of the type 1 chromium atom: 1 dyestuff molecule which corresponds to 0.52 part of chromium and 3.94 parts of the dyestuff from diazotised 2-hydroxy-1-aminonaphthalene - 4 - sulphonic acid and 2 - hydroxynaphthalene is also added. The whole is heated for 1 hour at 70–80°, the dyestuff formed is salted out and filtered off. After drying, the dyestuff is a dark powder which dyes wool from a weakly acid bath in blue-grey to black shades which have good fastness to light. It is the ammonium salt of the compound of the formula given above. If for example sodium acetate or sodium citrate are used instead of ammonium acetate then the corresponding sodium salts are obtained.

The chromium complex of the type 1 chromium atom: 1 dyestuff molecule mentioned in this example is produced by heating the metal-free dyestuff from diazotised 2-hydroxy-1-aminonaphthalene - 4 - sulphonic acid and 2-hydroxynaphthalene for example in water with excess chromic formiate in an acid medium at 100–105°.

A similar dyestuff is obtained if instead of the above azo dyestuff from 2-hydroxy-1-aminonaphthalene-4-sulphonic acid, that from diazotised 6-nitro-2-hydroxy-1-aminonaphthalene-4-sulphonic acid and 2-hydroxynaphthalene is used.

Example 3

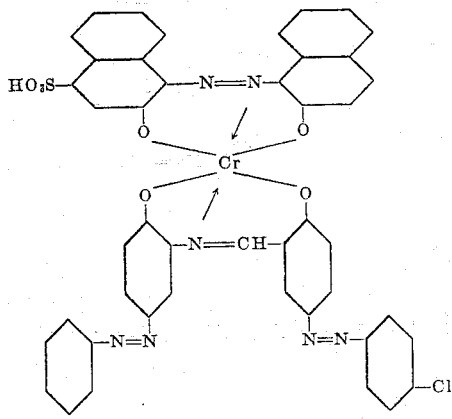

3 parts of crystallised sodium acetate, 4.55 parts of the azomethine disazo dyestuff from 4-hydroxy-3-formyl-4'-chloro-1.1'-azobenzene and 4-hydroxy-3-amino-1.1'-azobenzene are added to 200 parts by volume of ethanol and 20 parts by volume of water.

4.44 parts of the complex chromium compound of the type 1 chromium atom to 1 dyestuff molecule corresponding to 0.52 part of chromium and 3.94 parts of the monoazo dyestuff from diazotised 1-amino-2-hydroxynaphthalene-4-sulphonic acid and 2-hydroxynapthalene are also added.

The whole is heated for 3 hours at 60–65°, the ethanol is distilled off and the residue is evaporated to dryness. The dry dyestuff is a dark powder which dyes wool from a neutral to weakly acid bath in olive shades. It is the sodium salt of the compound of the formula given above.

Example 4

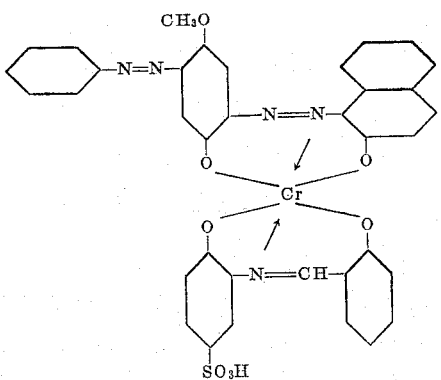

2 parts of crystallised sodium acetate and 2.92 parts of the azomethine compound from 2-amino-1-hydroxybenzene-4-sulphonic acid and salicylaldehyde are added to 100 parts of 50% ethanol. The complex chromium compound of the type 1 chromium atom : 1 dyestuff molecule which corresponds to 0.52 part of chromium and 3.98 parts of the disazo dyestuff from diazotised 5-phenylazo-4-methoxy-2-amino-1-hydroxybenzene and 2-hydroxynaphthalene is also added. The whole is heated for 3 hours at 40–50°, the alcohol is distilled off, the dyestuff formed is salted out and filtered off. After drying, it is a dark powder which dyes wool in green shades from an acetic acid bath. It is the sodium salt of the dyestuff of the above formula.

Example 5

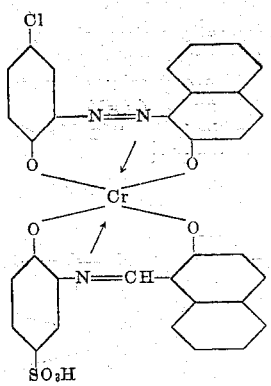

1.5 parts of potassium acetate and 3.43 parts of the azomethine compound from 2-amino-1-hydroxybenzene-4-sulphonic acid and 2-hydroxy-1-naphthaldehyde are added to 100 parts of aqueous 50% ethanol. The complex chromium compound of the type 1 chromium atom : 1 dyestuff molecule which corresponds to 0.52 part of chromium and 2.99 parts of the dyestuff from 4-chloro-2-amino-1-hydroxybenzene and 2-hydroxynaphthalene is added also. The whole is heated for 2 hours at 60–70°, the alcohol is distilled off, the dyestuff formed is salted out and filtered off. After drying, a dark powder is obtained which dyes wool in brown shades. It is the potassium salt of the compound of the formula given above.

Example 6

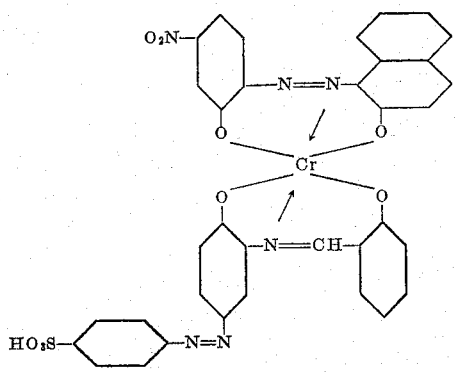

2 parts of crystallised sodium acetate and 3.97 parts of the azo-azomethine dyestuff obtained from 3-amino-4-hydroxyazobenzene-4'-sulphonic acid and salicylaldehyde are added to 100 parts of aqueous 50% ethanol. The complex chromium compound of the type 1 chromium atom : 1 dyestuff molecule which corresponds to 0.52 part of chromium and 3.11 parts of the dyestuff from diazotised 5-nitro - 2 - amino-1-hydroxybenzene and 2-hydroxynaphthalene is also added. The whole is heated for 30 minutes at 50–55°, the alcohol is distilled off and the mixed complex formed is salted out. After filtering off and drying, a dark powder is obtained; it is soluble in water and dyes wool, silk, and nylon in olive to khaki coloured shades. The dyestuff is the sodium salt of the compound of the formula given above.

If in the above example the 3.97 parts of the azo-azomethine dyestuff named are replaced by 4.47 parts of the azo-azomethine dyestuff obtained from 3-amino-4-hydroxybenzene-1.1'-azonaphthalene-4'-sulphonic acid and salicylaldehyde, then a dyestuff having similar properties is obtained.

The chromium complex of the type 1 chromium atom:1 dyestuff molecule mentioned in this example is produced by heating the metal-free dyestuff from diazotised 5-nitro-2-amino-hydroxybenzene and 2-hydroxynaphthalene in aqueous ethanol with excess chromic sulphate and sulphuric acid in the autoclave for 14 hours at 125–130°.

Example 7

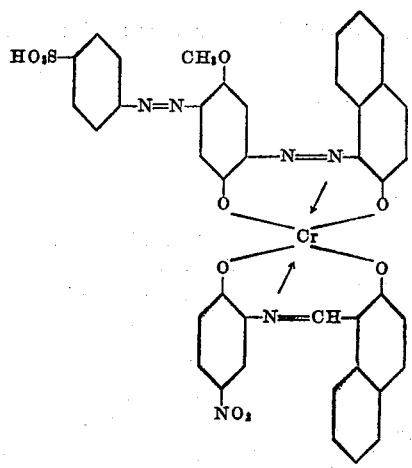

3.08 parts of the azomethine compound from 4-nitro-2-amino-1-hydroxybenzene and 1-formyl-2-hydroxynaphthalene, 5.28 parts of the complex chromium compound of the type 1 chromium atom:1 dyestuff molecule which corresponds to 0.52 part of chromium and 4.78 parts of the disazo dyestuff from diazotised 3-hydroxy-4-amino-6-methoxy - 1.1' - azobenzene-4'-sulphonic acid and 2-hydroxynaphthalene (obtained by chroming the diazo dyestuff from diazotised 4-amino-3.6-dimethoxy-1.1'-azobenzene-4'-sulphonic acid and 2-hydroxynaphthalene in formamide while entmethoxylating in the known manner) and 20 parts by volume of an aqueous lithium acetate solution (corresponding to 2.3 parts of crystallised lithium acetate) are added to 200 parts by volume of ethanol. The whole is heated for 3 hours at 60–65° and the reaction product is evaporated to dryness. The dyestuff obtained is, after drying, a dark powder which dyes wool from a neutral to weakly acid bath in green-olive shades. The dyeings have good fastness properties. It is the lithium salt of the dyestuff of the above formula. If an aqueous solution of sodium acetate (corresponding to 3 parts of sodium acetate) is used, then the corresponding sodium salt is obtained.

Example 8

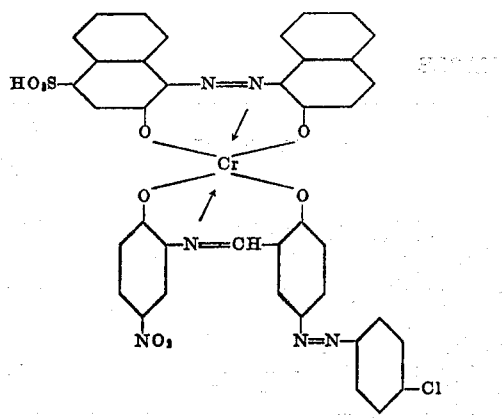

3.97 parts of the azomethine dyestuff from 4-hydroxy-3-formyl-4'-chloro-1.1'-azobenzene and 4-nitro-2-amino-1-hydroxybenzene are dissolved in 200 parts by volume of ethanol. 4.44 parts of the complex chromium compound of the type 1 chromium atom : 1 dyestuff molecule which corresponds to 0.52 part of chromium and 3.94 parts of the monoazo dyestuff from diazotised 1-amino-2-hydroxynaphthalene-4-sulphonic acid and 2-hydroxynaphthalene are added to this solution.

20 parts by volume of an aqueous sodium acetate solution (corresponding to 3 parts of sodium acetate) are also added and the mixture is stirred for 3 hours at 60–65°. The greater part of the ethanol is distilled off, sodium chloride solution is added and the dyestuff which precipitates is filtered off. After drying, it is a dark powder which dyes wool from a neutral or weakly acid bath in olive green shades which have good general fastness properties. The dyestuff is the sodium salt of the formula given above.

Example 9

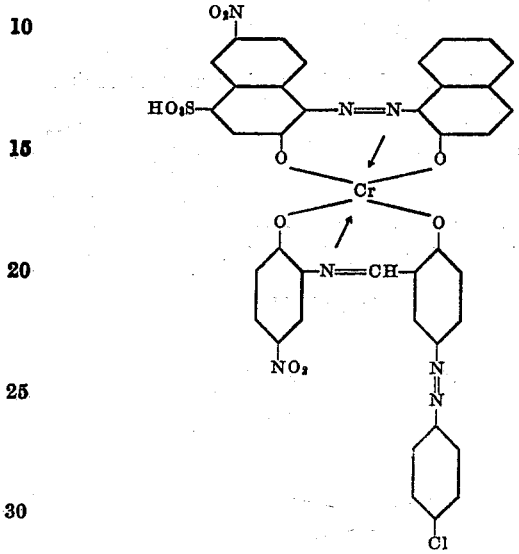

1.5 parts of potassium acetate and 3.97 parts of the azo-azomethine dyestuff from 4 - hydroxy - 3 - formyl-4'-chlorazobenzene and 4-nitro-2-amino-1-hydroxybenzene are added to 100 parts of aqueous 50% alcohol. The complex chromium compound of the type 1 chromium atom : 1 dyestuff molecule which corresponds to 0.52 part of chromium and 4.39 parts of the dyestuff from diazotised 6-nitro-2-hydroxy - 1 - aminonaphthalene-4-sulphonic acid and 2-hydroxynaphthalene is also added. The whole is heated for 1 hour at 70–80°, the alcohol is distilled off, the mixed complex formed is salted out and filtered off. After drying, a dark powder is obtained which dyes wool in olive green shades having good fastness to light. The dyestuff is the potassium salt of the compound defined above.

The chromium complex of the type 1 chromium atom: 1 dyestuff molecule mentioned above is obtained by heating the metal-free monoazo dyestuff from diazotised 6-nitro-2-hydroxy-1-aminonaphthalene-4-sulphonic acid and 2-hydroxynaphthalene for example in water with excess chromic formiate in an acid medium at 100–105°.

Example 10

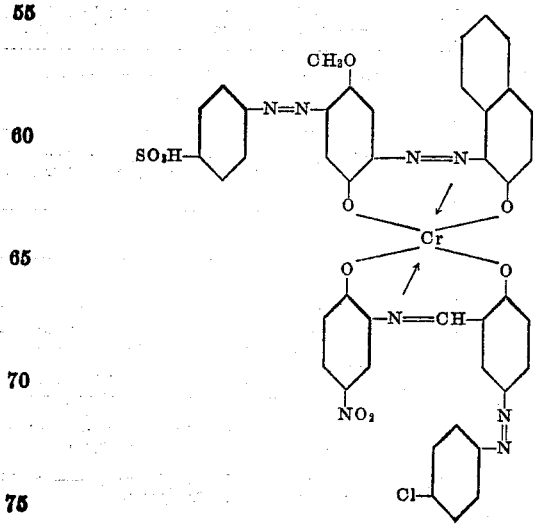

3.97 parts of the azomethine azo dyestuff from 4-hydroxy-3-formyl-4'-chloro-1.1'-azobenzene and 4-nitro-2-amino-1-hydroxybenzene, 5.28 parts of the complex chromium compound of the type 1 chromium atom : 1 dyestuff molecule which corresponds to 0.52 part of chromium and 4.78 parts of the disazo dyestuff from 3-hydroxy-4-amino-6-methoxy-1.1'-azobenzene-4'-sulphonic acid and 2-hydroxynaphthalene (obtained by chroming the disazo dyestuff from diazotised 4-amino-3.6-dimethoxy-1.1'-azobenzene-4'-sulphonic acid and 2-hydroxynaphthalene in formamide while entmethoxylating in the known manner) and 20 parts by volume of an aqueous sodium acetate solution (corresponding to 3 parts of sodium acetate) are added to 200 parts by volume of ethanol. The whole is heated for 3 hours at 60–65° and the product is evaporated to dryness. The dyestuff, which is the sodium salt of the compound of the formula given above, is a dark powder which dyes wool from a neutral to weakly acid bath in green olive shades.

*Example 11*

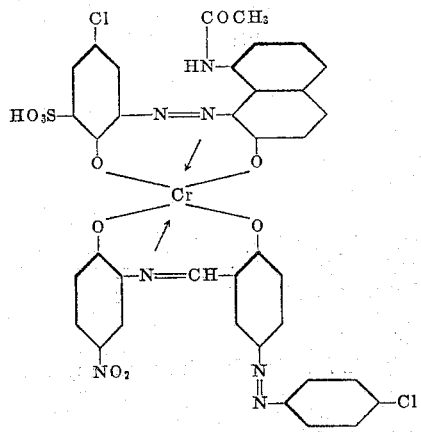

3.97 parts of the azomethine dyestuff from 4-hydroxy-3-formyl-4'-chloro-1.1'-azobenzene and 4-nitro-2-amino-1-hydroxybenzene are dissolved in 200 parts by volume of ethanol. 4.85 parts of the complex chromium compound of the type 1 chromium atom : 1 dyestuff molecule which corresponds to 0.52 part of chromium and 4.36 parts of the monoazo dyestuff from diazotised 4-chloro-2-amino-1-hydroxybenzene-6-sulphonic acid and 1-acetyl-amino-7-hydroxynaphthalene are added to this solution.

20 parts by volume of an aqueous sodium acetate solution (corresponding to 3 parts of sodium acetate) are also added and the mixture is stirred at 60–65° until a dyestuff is formed. The greater part of the ethanol is distilled off, sodium chloride is added and the precipitated dyestuff is filtered off. After drying, it is a dark powder which dyes wool from a neutral or weakly acid bath in olive-green shades which have good fastness properties.

*Example 12*

2 parts of the chromium-containing dyestuff obtained according to Example 4 are dissolved in 4000 parts of water and 100 parts of previously well wetted wool are entered into the dyebath at 40–50°. 2 parts of 40% acetic acid are then added, the bath is brought to the boil within half an hour and kept at the boil for 45 minutes. The wool is then rinsed with cold water and dried. The blue-grey wool dyeing has good fastness to light.

A wool dyeing with good properties is also obtained if dyeing is performed in a liquor containing Glaubers salt.

*Example 13*

2 parts of the dyestuff obtained according to Example 5 are dissolved in 4000 parts of water and 100 parts of wetted wool are entered into the dyebath at 40–50°. The bath is brought to the boil within half an hour and kept at the boil for 45 minutes whereupon the wool is rinsed with cold water and dried. The olive green dyeing obtained has good fastness properties.

Other complex chromium compounds are obtained according to the processes described in the above examples when the azo and azomethine dyestuffs given in the following table are used as starting products.

TABLE

| No. | Azo dyestuff | Azomethine dyestuff | Colour of chromium complexes on wool |
|---|---|---|---|
| 1 | 1-amino-2-hydroxynaphthalene-4-sulphonic acid ⟶ 2-hydroxynaphthalene (3.94 parts). | from 4-nitro-2-amino-1-hydroxybenzene and 2-hydroxy-1-naphthaldehyde (3.08 parts). | olive-grey. |
| 2 | do | from 5-nitro-2-amino-1-hydroxybenzene and 2-hydroxy-1-naphthaldehyde (3.08 parts). | brown-violet. |
| 3 | 4-chloro-2-amino-1-hydroxybenzene ⟶ 2-hydroxynaphthalene (2.99 parts). | from 2-amino-1-hydroxybenzene-4-carboxylic acid and 3.5-dichloro-2-hydroxybenzaldehyde (3.26 parts). | brown. |
| 4 | do | from 2-amino-1-hydroxybenzene-4-carboxylic acid and 2-hydroxy-1-naphthaldehyde (3.07 parts). | Do. |
| 5 | 6-nitro-2-hydroxy-1-aminonaphthalene-4-sulphonic acid ⟶ 2-hydroxynaphthalene (4.39 parts). | from [4-chloraniline ⟶ 4-methyl-2-amino-1-hydroxybenzene] and 2-hydroxybenzaldehyde (3.66 parts). | black. |
| 6 | do | from [4-chloraniline ⟶ 2-hydroxybenzaldehyde] and 5-nitro-2-amino-1-hydroxybenzene (3.97 parts). | olive. |
| 7 | do | from [4-chloraniline ⟶ 2-hydroxybenzaldehyde] and 4.6-dinitro-2-amino-1-hydroxybenzene (4.42 parts). | Do. |
| 8 | do | from 3-amino-4-hydroxyazobenzene and 2-hydroxybenzaldehyde (3.1 parts). | khaki. |
| 9 | 4-nitro-2-amino-1-hydroxybenzene-6-sulphonic acid ⟶ 4-t-amyl-1-hydroxybenzene (4.09 parts). | from [4-chloraniline ⟶ 2-hydroxybenzaldehyde] and 4-nitro-2-amino-1-hydroxybenzene (3.97 parts). | brown. |
| 10 | 5-nitro-2-amino-1-hydroxybenzene ⟶ 2-phenylamino-5-hydroxynaphthalene-7-sulphonic acid (4.80 parts). | do | green. |
| 11 | 1-amino-2-hydroxynaphthalene-4-sulphonic acid ⟶ 2-hydroxynaphthalene (3.94 parts). | from [4-chloraniline ⟶ 2-hydroxybenzaldehyde] and 6-nitro-4-methyl-2-amino-1-hydroxybenzene (4.11 parts). | brown-olive. |
| 12 | 4-chloro-2-amino-1-hydroxybenzene ⟶ 2-hydroxynaphthalene (2.99 parts). | from 3-amino-4-hydroxyazobenzene-4'-sulphonic acid and 2-hydroxybenzaldehyde (3.97 parts). | brown. |

TABLE—Continued

| No. | Azo dyestuff | Azomethine dyestuff | Colour of chromium complexes on wool |
|---|---|---|---|
| 13 | 4-nitro-2-amino-1-hydroxybenzene ⟶ 1-phenyl-3-methyl-5-pyrazolone-3'-sulphonic acid (4.19 parts). | from [4-chloraniline ⟶ 2-hydroxybenzaldehyde] and 4-nitro-2-amino-1-hydroxybenzene (3.97 parts). | orange. |
| 14 | 4-nitro-2-amino-1-hydroxybenzene ⟶ 1-phenyl-3-methyl-5-pyrazolone (3.39 parts). | from [4-chloraniline ⟶ 2-hydroxybenzaldehyde] and 4-chloro-2-amino-1-hydroxybenzene-6-sulphonic acid (4.66 parts). | Do. |
| 15 | do | from 2-amino-1-hydroxybenzene-4-carboxylic acid and 2-hydroxy-1-naphthaldehyde (3.07 parts). | Do. |
| 16 | 2-amino-1-hydroxybenzene-4-carboxylic acid ⟶ 2-hydroxynaphthalene (3.08 parts). | from 4-nitro-2-amino-1-hydroxybenzene and 2-hydroxy-1-naphthaldehyde (3.08 parts). | brown. |
| 17 | do | from 4-nitro-2-amino-1-hydroxybenzene and 3.5-dichloro-2-hydroxybenzaldehyde (3.27 parts). | Do. |
| 18 | do | from 5-nitro-2-amino-1-hydroxybenzene and 3.5-dichloro-2-hydroxybenzaldehyde (3.27 parts). | Do. |
| 19 | 4-nitro-2-amino-1-hydroxybenzene-6-sulphonic acid ⟶ 4-t-amyl-1-hydroxybenzene (4.09 parts). | from aniline ⟶ 2-hydroxybenzaldehyde and 4-nitro-2-amino-1-hydroxybenzene (3.62 parts). | Do. |
| 20 | 5-nitro-2-amino-1-hydroxybenzene ⟶ 2-hydroxynaphthalene (3.09 parts). | from [1-aminonaphthalene-4-sulphonic acid ⟶ 2-acetylamino-1-hydroxybenzene] saponified and 2-hydroxy-1-naphthaldehyde (4.97 parts). | olive. |
| 21 | do | from [1-aminonaphthalene-4-sulphonic acid ⟶ 2-acetylamino-1-hydroxybenzene] saponified and 3.5-dichloro-2-hydroxybenzaldehyde (5.16 parts). | Do. |
| 22 | 1-amino-2-hydroxynaphthalene-4-sulphonic acid ⟶ 2-hydroxynaphthalene (3.94 parts). | from [4-chloraniline ⟶ 2-acetylamino-1-hydroxybenzene] saponified and 2-hydroxy-1-naphthaldehyde (4.02 parts). | Do. |
| 23 | do | from [aniline ⟶ 2-acetylamino-1-hydroxybenzene] saponified and 2-hydroxy-1-naphthaldehyde (3.67 parts). | Do. |
| 24 | do | from 2-ethyl aniline ⟶ 2-hydroxybenzaldehyde and 4-nitro-2-amino-1-hydroxybenzene (3.90 parts). | Do. |
| 25 | do | from [aniline ⟶ 2-acetylamino-1-hydroxybenzene] saponified and 2-hydroxybenzaldehyde (3.17 parts). | Do. |
| 26 | 4-nitro-2-amino-1-hydroxybenzene-6-sulphonic acid ⟶ 4-t-amyl-1-hydroxybenzene (4.09 parts). | do | brown. |

What we claim is:

1. The complex chromium compound corresponding to the general formula:

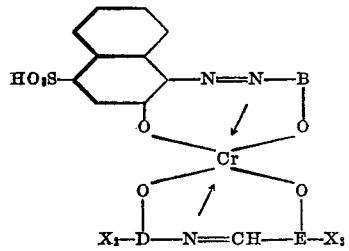

wherein
B represents a naphthalene radical containing the metallised group in o-position to the azo group,
D and E each represents a benzene radical containing the metallised group in o-position to the azomethine group, and of
$X_2$ and $X_3$, one X represents a phenyl azo group and the other X represents hydrogen.

2. The complex chromium compound corresponding to the formula:

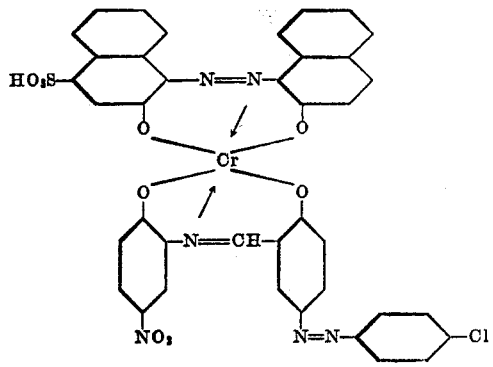

3. The complex chromium compound corresponding to the formula:

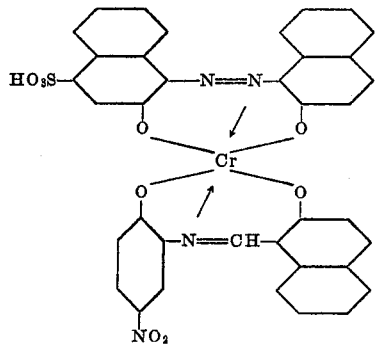

4. The complex chromium compound corresponding to the formula:

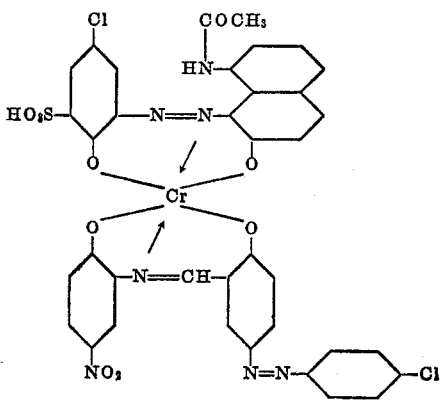

5. The complex chromium compound corresponding to the formula:
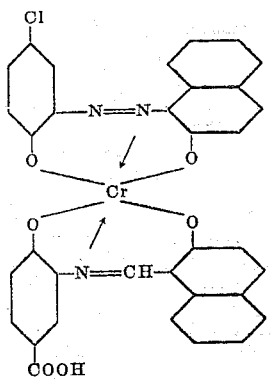
6. The complex chromium compound corresponding to the formula:
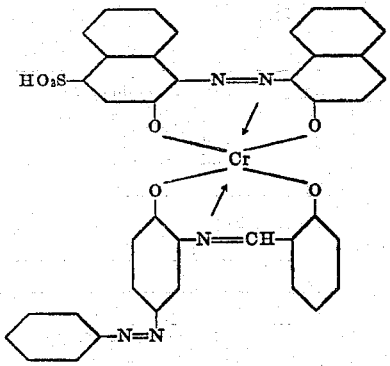
References Cited in the file of this patent
UNITED STATES PATENTS
| | | |
|---|---|---|
| 2,685,595 | Pfitzner et al. | Aug. 3, 1954 |
| 2,806,760 | Brassel et al. | Sept. 17, 1957 |
| 2,813,853 | Steineman | Nov. 19, 1957 |
| 2,817,575 | Binder et al. | Dec. 24, 1957 |
| 2,855,393 | Schetty et al. | Oct. 7, 1958 |
FOREIGN PATENTS
| | | |
|---|---|---|
| 775,385 | Great Britain | May 22, 1957 |
OTHER REFERENCES
Lubs: Chemistry of Synthetic Dyes and Pigments, 1955, pages 247, 248.